US011201347B2

(12) United States Patent
Lee

(10) Patent No.: US 11,201,347 B2
(45) Date of Patent: *Dec. 14, 2021

(54) SECONDARY-CELL MANUFACTURING SYSTEM FOR FORMING AN ELECTRODE ASSEMBLY USING LAMINATION

(71) Applicant: Sora Lee, Seongnam-si (KR)

(72) Inventor: Jun Chul Lee, Seongnam-si (KR)

(73) Assignee: Sora Lee, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,248

(22) Filed: Sep. 28, 2020

(65) Prior Publication Data

US 2021/0098814 A1  Apr. 1, 2021

(30) Foreign Application Priority Data

Sep. 30, 2019  (KR) .................. 10-2019-0120875
Feb. 5, 2020  (KR) .................. 10-2020-0013906

(51) Int. Cl.
*H01M 10/04* (2006.01)
*H01M 10/0585* (2010.01)

(52) U.S. Cl.
CPC ... *H01M 10/0404* (2013.01); *H01M 10/0585* (2013.01)

(58) Field of Classification Search
CPC ............ H01M 10/0404–0468; H01M 10/0585
See application file for complete search history.

(56) References Cited

U.S. PATENT DOCUMENTS

2019/0148761 A1* 5/2019 Lee .................. H01M 10/0463
429/131

FOREIGN PATENT DOCUMENTS

| KR | 10-2015-0037089 A | 4/2015 |
| KR | 10-2016-0094182 A | 8/2016 |
| KR | 10-1837724 B1 | 3/2018 |

* cited by examiner

*Primary Examiner* — Osei K Amponsah
(74) *Attorney, Agent, or Firm* — Novick, Kim & Lee, PLLC; Sang Ho Lee; Hyun Woo Shin

(57) ABSTRACT

The secondary-cell manufacturing system that forms the electrode assembly with lamination as demonstrated includes the unit-cell-forming device that forms a unit-cell from a separator roll, negative-cell roll, and positive-cell roll as stacked in the order of separator/negative cell/separator/positive cell/separator, the overturning device that forms an inverse unit-cell stacked in the order of separator/positive cell/separator/negative cell by overturning a portion of minimum 2 cells that are formed by the unit-cell-forming device, and the stacking device that performs stacking in the order of unit-cell/negative cell/inverse unit-cell/positive cell. Accordingly, the invention provides a secondary-cell manufacturing system that forms an electrode assembly, which simplifies the process for building the electrode assembly, reduces the defect rate for the built electrode assembly, and forms the electrode assembly with lamination.

2 Claims, 14 Drawing Sheets

SECONDARY-CELL MANUFACTURING SYSTEM FOR FORMING AN ELECTRODE ASSEMBLY USING LAMINATION

TECHNICAL FIELD

This invention is concerned with the secondary-cells manufacturing system that forms the electrode assembly with lamination.

BACKGROUND TECHNOLOGY

The rechargeable secondary cell is widely used as an energy source for mobile devices. Also, secondary cell is used as the means to storage energy for electrical vehicle etc. that are presented as a way to address issues such as the gas emissions from internal combustion engine and the depletion of fossil fuels.

By its internal or external structural characteristics, secondary cell is classified into cylindrical cell, prismatic cell, and pouch cell.

The electrode assembly with the composition of cathode/separator/anode that makes up a secondary cell is categorized by its structure broadly into the jelly-rolled type and the stacked type. The jelly-rolled electrode assembly is manufactured by coating a metal foil, which is used as a current collector, with electrode activating agent etc., drying and stamping it, cutting it into bands with desired width and length, partitioning them into anode and cathode with a separator, and winding them as spirals.

The jelly-rolled electrode assembly as such is best used for a cylindrical cell. When applied to a prismatic or pouch cell, however, electrode activating agent is peeled by the locally concentrated stress or the cell is deformed by the repeated contraction and expansion during its charge and discharge.

On the other hand, the stacked electrode assembly, which is built by stacking sequentially a number of cathode and negative unit-cells, has the advantage of readily delivering an angular shape, but has the disadvantages of a complex manufacturing process and a short circuit caused by an electrode nudged when shock is applied.

To address such issues, some prior arts developed the stack-folding electrode assembly as a mix of the jelly-rolled type and the stacked type that folded the full cell with a specified size and the composition of cathode/separator/anode or the bicell with the composition of cathode (anode)/separator/anode (cathode) with a long, continuous separation film.

However, this method has the disadvantage that it requires an inner space or system for the manufacturing process because unit-cells have to be arranged over a long sheet-like separator and the folding has to be performed by holding the cell and the separator at both ends among others, it involves a very complex process, and it involves a costly facility investment as a result. Moreover, defect rate with the electrode assembly may rise, because the cells available in increasing numbers are arranged in series and are hard to cut.

PATENT REFERENCE (Patent Reference 0001) Republic of Korea Official Gazette—Patents 10-1837724 (Mar. 6, 2018)

THE CONTENT OF THE INVENTION

The Issue to be Solved

Given the above, the invention aims to provide the secondary-cell manufacturing system that forms the electrode assembly with lamination.

The Solution to the Issue

With the aim of fulfilling the purpose, the secondary-cell manufacturing system that builds unit-cells with lamination and simplifies the process which forms an electrode assembly with those unit-cells as shown in an embodiment of the invention comprises the unit-cell-forming device that forms a unit-cell from a separator roll, negative-cell roll, and positive-cell roll as stacked in the order of separator/negative cell/separator/positive cell/separator, the overturning device that forms an inverse unit-cell stacked in the order of separator/positive cell/separator/negative cell/separator by overturning a portion of minimum 2 cells that are formed by the unit-cell-forming device, and the stacking device that performs stacking in the order of unit-cell/negative cell/inverse-unit-cell/positive cell. The unit-cell-forming device forms cells by stacking and integrating them in the order of separator/negative cell/separator and then stacking and integrating positive cell/separator thereon.

With the aim of fulfilling the purpose, the secondary-cell manufacturing system that builds unit-cells with lamination and simplifies the process which forms an electrode assembly with those unit-cells as shown in an embodiment of the invention comprises the unit-cell-forming device that forms a unit-cell from a separator roll, negative-cell roll, and positive-cell roll as stacked in the order of separator/negative cell/separator/positive cell/separator, the overturning device that forms an inverse unit-cell stacked in the order of separator/positive cell/separator/negative cell/separator by overturning a portion of minimum 2 cells that are formed by the unit-cell-forming device, and the stacking device that performs stacking in the order of unit-cell/negative cell/inverse unit-cell/positive cell. The unit-cell-forming device forms unit-cells by stacking and integrating them in the order of separator/negative cell/separator and then placing and integrating anode cell/separator thereunder.

Also, the unit-cell-forming device may comprise the guide that handles the overlapping of separator, negative cell, and positive cell which are released from the separator roll, the negative-cell roll, and the positive-cell roll, the negative-cell cutter which forms the negative cells by dividing a negative cell into a specified size and cuts the negative cells to ensure that they are arranged with a specified interval, the positive-cell cutter which forms the positive cells by dividing a positive cell into a specified size and cuts the positive cells to ensure that they are arranged with a specified interval, Laminator 1 and Laminator 2 that handles the orderly stacking and integration of separator, negative unit-cells that are arranged with a specified interval, separator, positive unit-cells that are arranged with a specified interval, and separator, and the unit-cell cutter which cuts in the cell size the separator which is integrated in Laminator 1 and Laminator 2, negative unit-cells that are arranged with a specified interval, separator, positive unit-cells that are arranged with a specified interval, and separator.

Also, an idle roller which guides the integrated separator, the negative unit-cells that are arranged with a specified interval, the separator, the positive unit-cells that are arranged with a specified interval, and the separator from Laminator 2 to the unit-cell cutter may be placed between Laminator 2 and the unit-cell cutter.

Also, the overturning device may comprise the conveyor belt, the suction drum through which unit cells are continuously supplied, is placed on top surface of the conveyor belt, and absorbs cells, the table which matches the one top side of the suction drum and takes over cells as overturned from the suction drum, and the top transporter which receives the unit-cells as overturned from the table and transports them to the magazine.

Also, circumferential surface of the suction drum may form a suction part where one or more suction holes are arranged in the direction that parallels the rotating shaft of the suction drum.

Also, the table may include a block that limits the location of a unit-cell on the top surface of the table by contacting the end of the unit-cell.

Also, the top transporter may comprise the body which is parallel to the rotating shaft of the suction drum and is placed at the top of the table to ensure its longitudinal shuttling and suction part 1 and suction part 2 which are available at both longitudinal ends of the body.

Also, when the body shuttles longitudinal, either of suction part 1 and suction part 2 may absorb the overturned unit-cell that lies on the table, while either of suction part 1 and suction part 2 on the other side may deliver the overturned unit-cell to the magazine.

Also, the stacking device comprises the floor which deploys a unit-cell in Position 1, an negative cell in Position 2 vis-à-vis the cell, an inverse unit-cell in Position 3, and a positive cell in Position 4 vis-à-vis the inverse unit-cell, the stage which plies between unit-cell and negative cell or between inverse unit-cell and positive cell, and one or more robot arms which load the prepared unit-cell/negative cell/inverse unit-cell/positive cell sequentially in Position one or Position 4.

Also, the stage may be tilted at a specified crossing angle toward Position 1, Position 2, Position 3, and Position 4.

Also, Position 1 and Position 3 may lie on the one side of the path through which the stage travels, while Position 2 and Position 4 may lie on the other side of the path through which the stage travels.

Also, each robot arm may come between Position 1 and Position 3 and between Position 2 and Position 4.

The Benefits of the Invention

According to the secondary-cell manufacturing system that simplifies the process which builds unit-cells with lamination and the process which forms an electrode assembly with cells as in the embodiment of the invention, the process that builds the electrode assembly is simplified and the defect rate with the built electrode assembly is reduced.

Especially, as unit-cells are made with lamination, it is easy to build unit-cells. And as the invention has adopted the replacement and stacking of the unit-cells and electrode assemblies built with lamination to form electrode assemblies, the preparation of unit-cells and electrode assemblies is simplified. And eliminating the defective electrodes during the preparation can significantly reduce the frequency of rework.

Moreover, unit-cells and electrode cells can be placed in the correct positions with tilting stage and robot arm. Ultimately, it can decrease the defect rate with the electrode assemblies.

BRIEF DESCRIPTION OF THE DRAWINGS

Drawing 1 is a block diagram that describes the secondary-cell manufacturing system which forms electrode assemblies with lamination as shown in the embodiment of the invention.

Drawing 2 and Drawing 3 illustrate the unit-cell-forming device equipped in the secondary-cell manufacturing system which forms electrode assemblies with lamination in Drawing 1.

Figure 1:
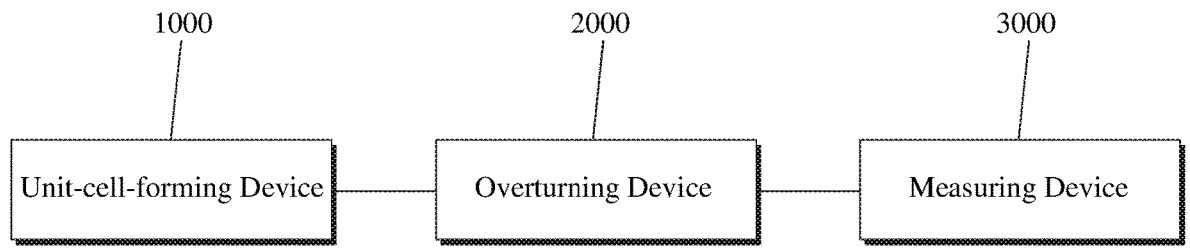
Figure 2:
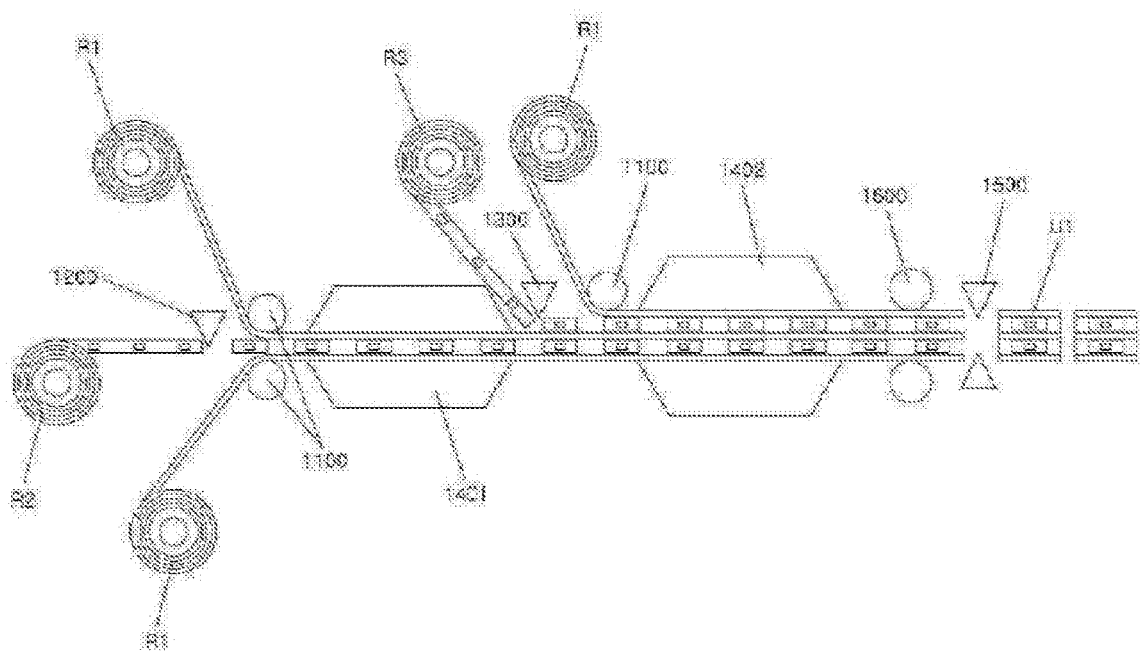
Figure 3:
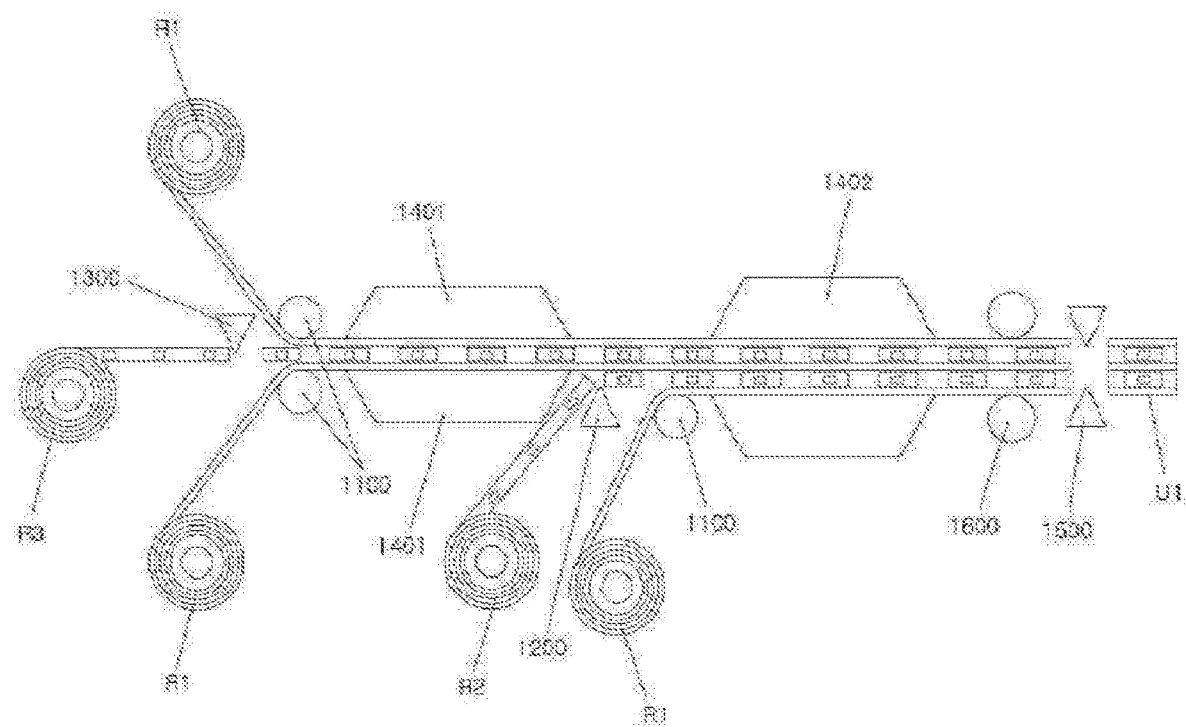
Figure 4:
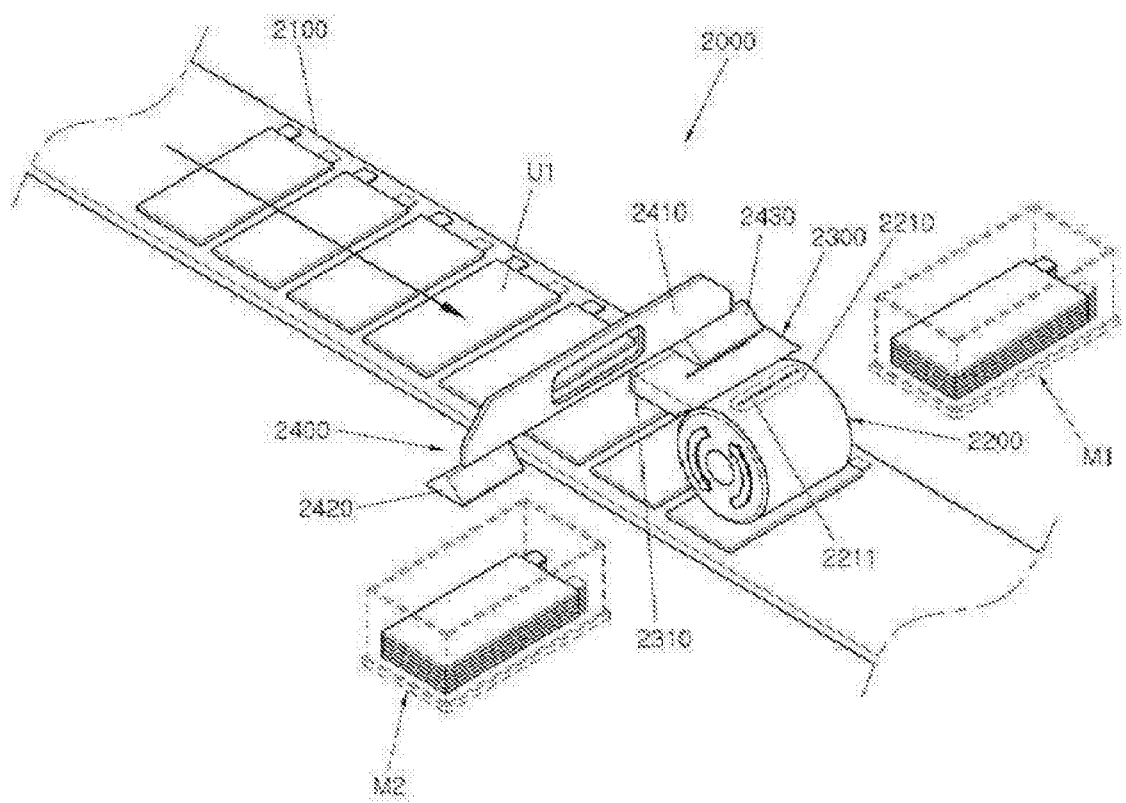
Figure 5:
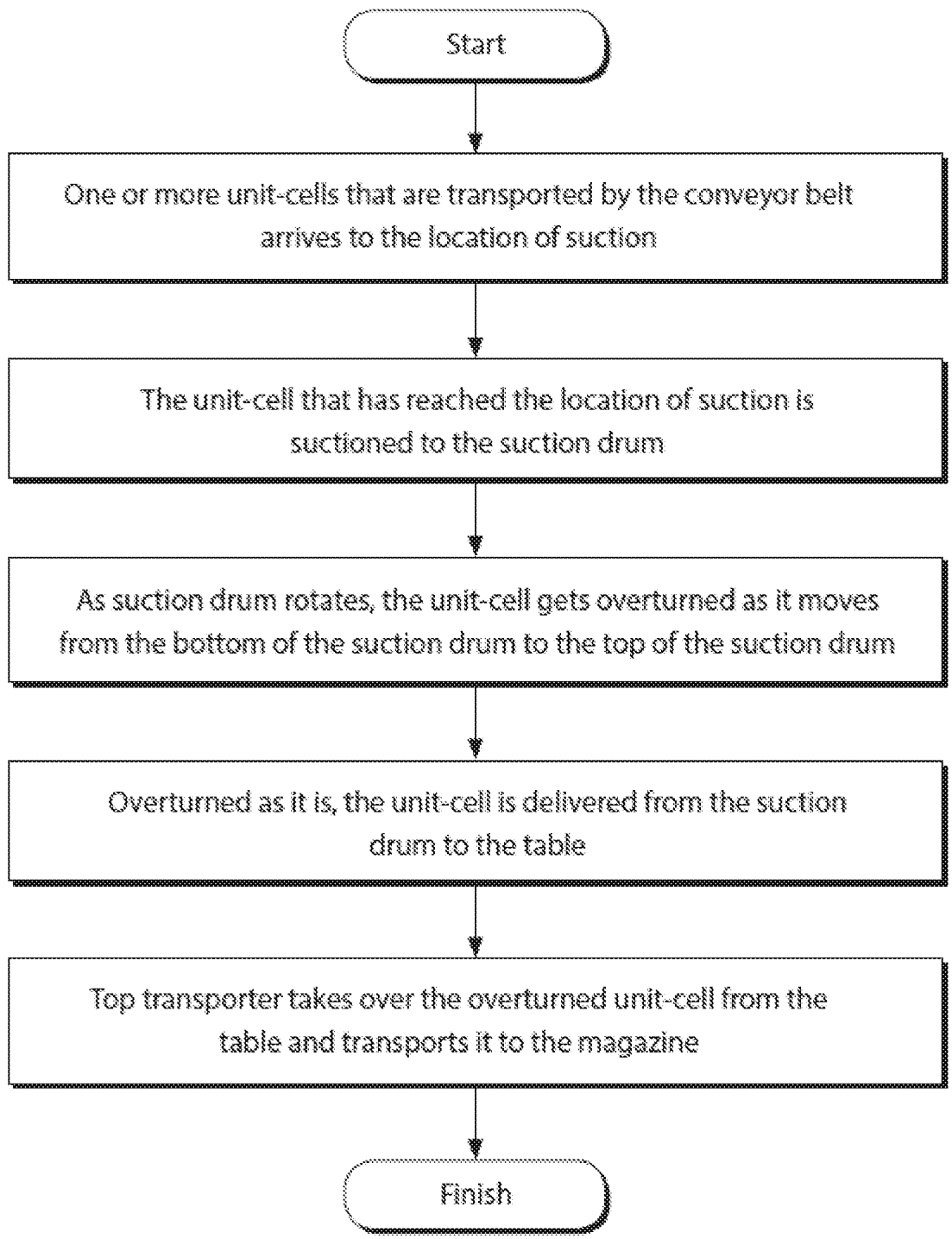
Figure 6:
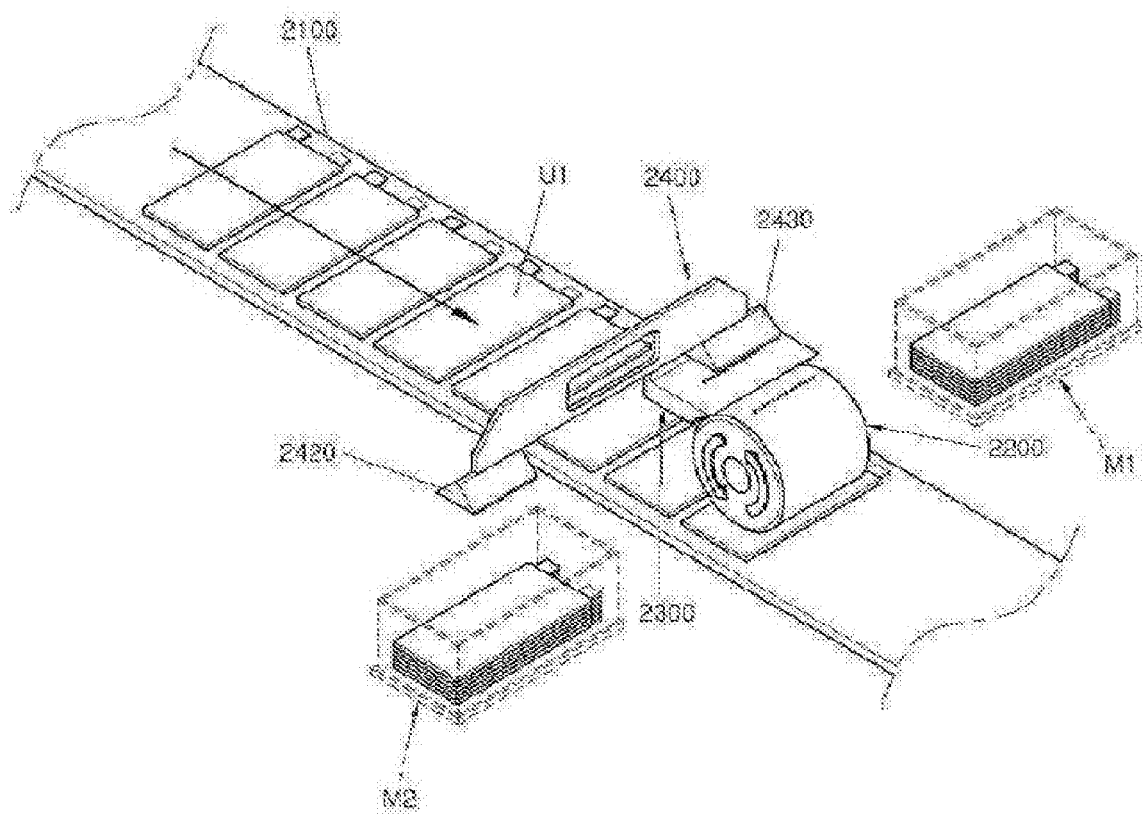
Figure 7:
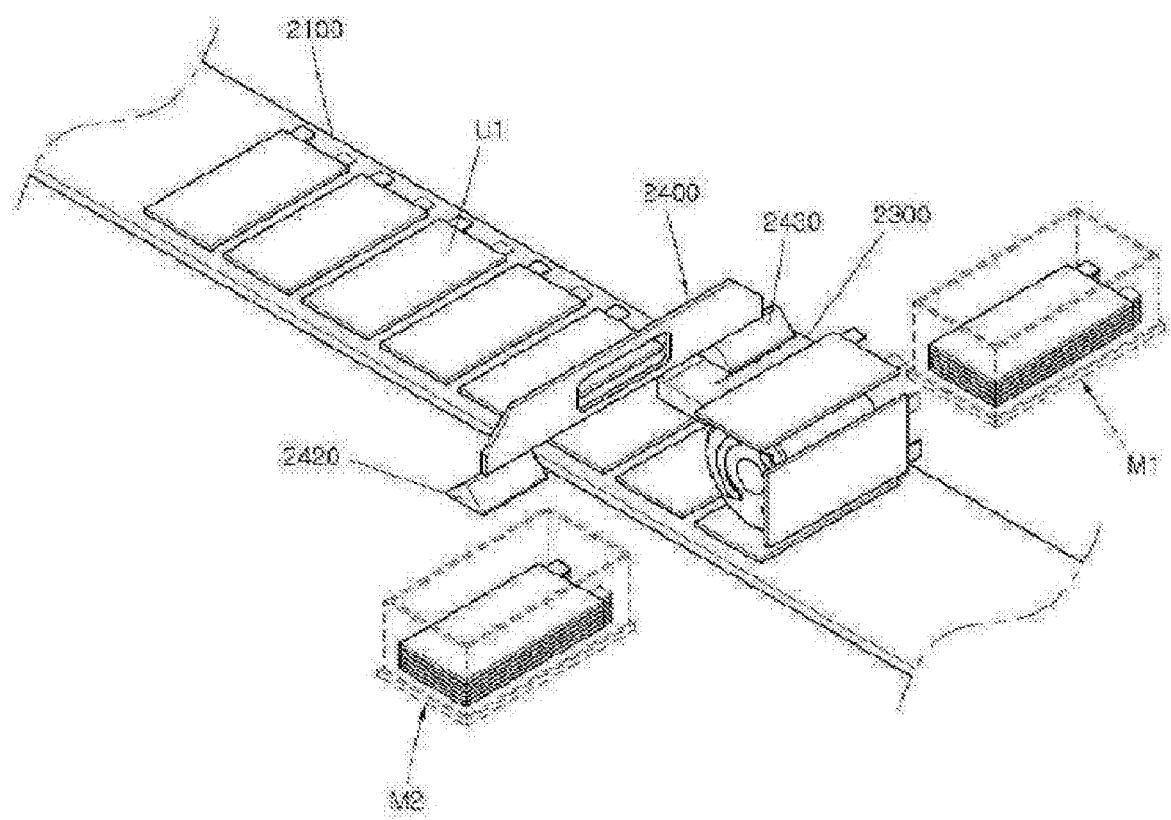
Figure 8:
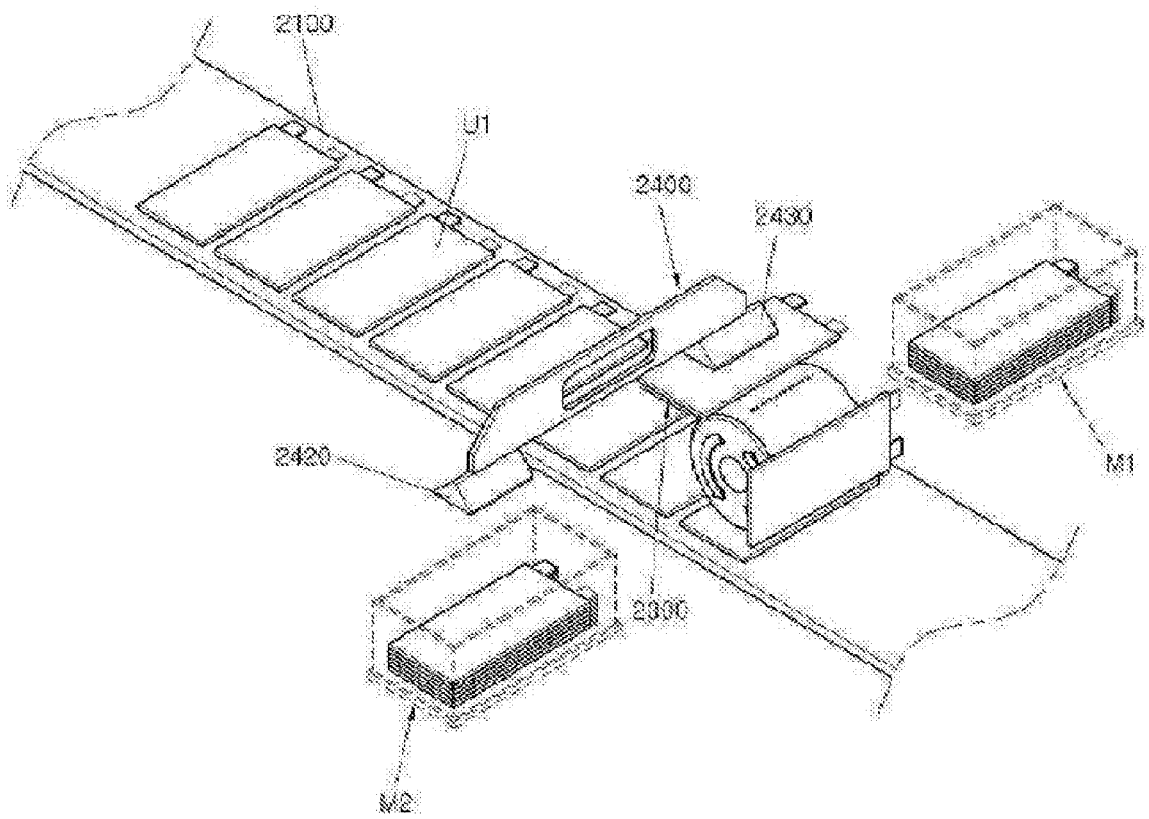
Figure 9:
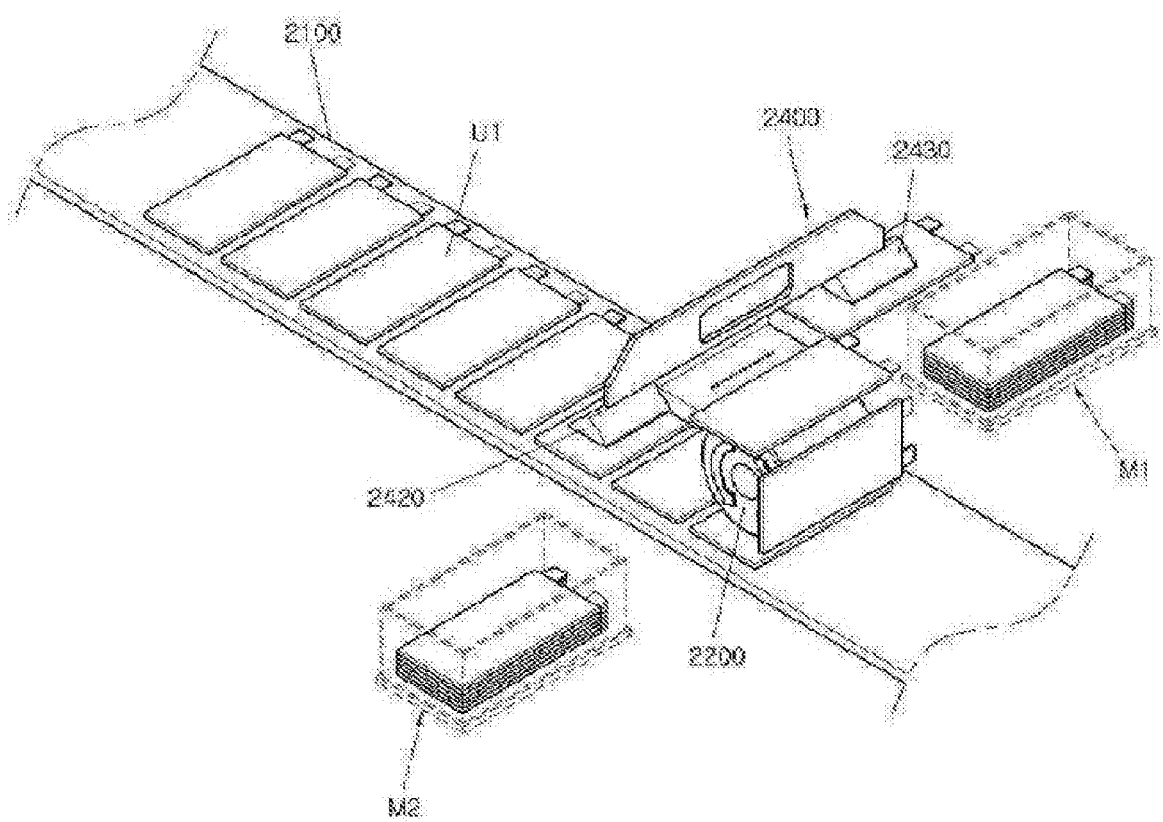
Figure 10:
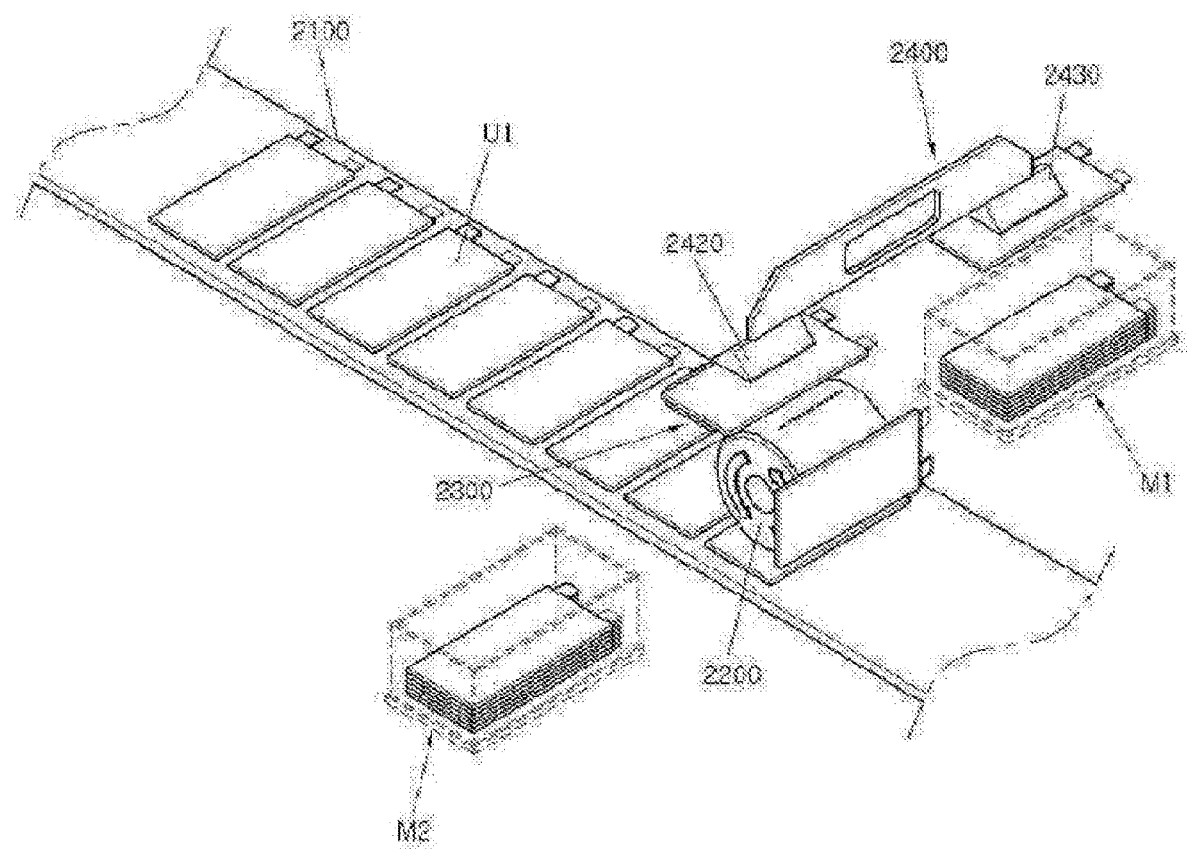
Figure 11:
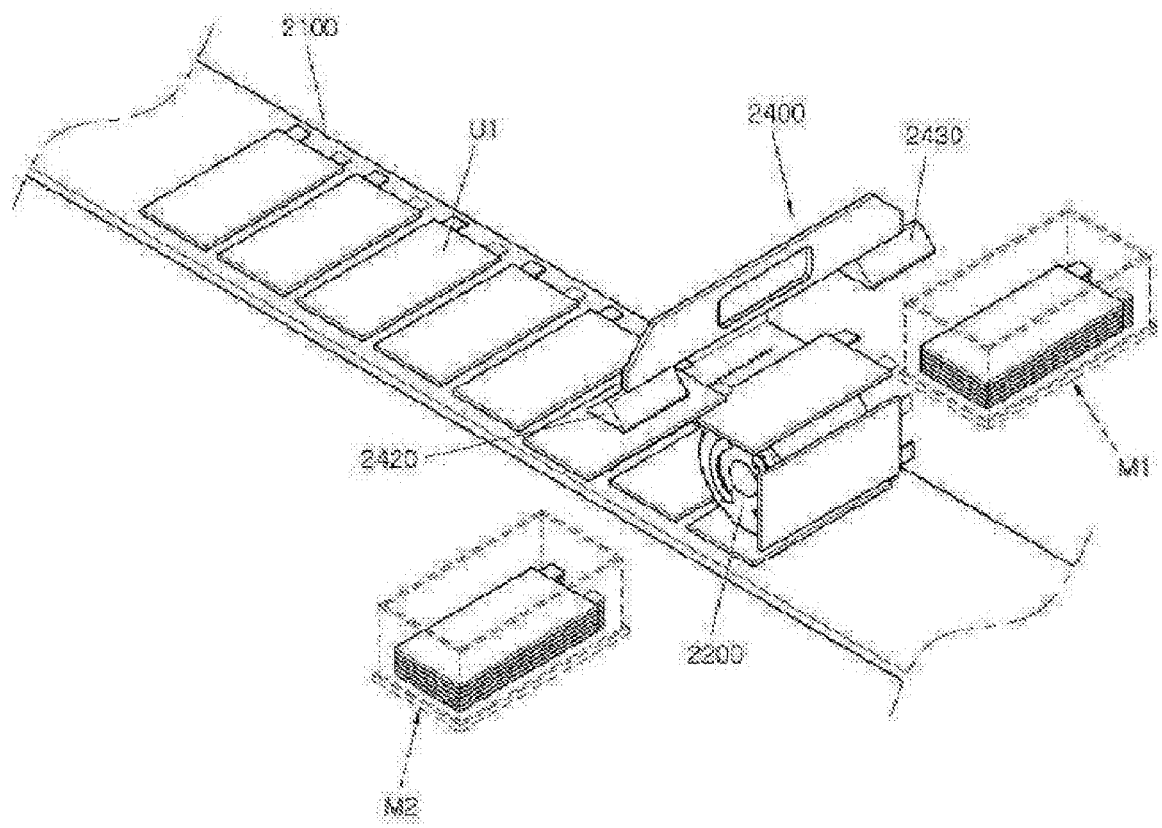
Figure 12:
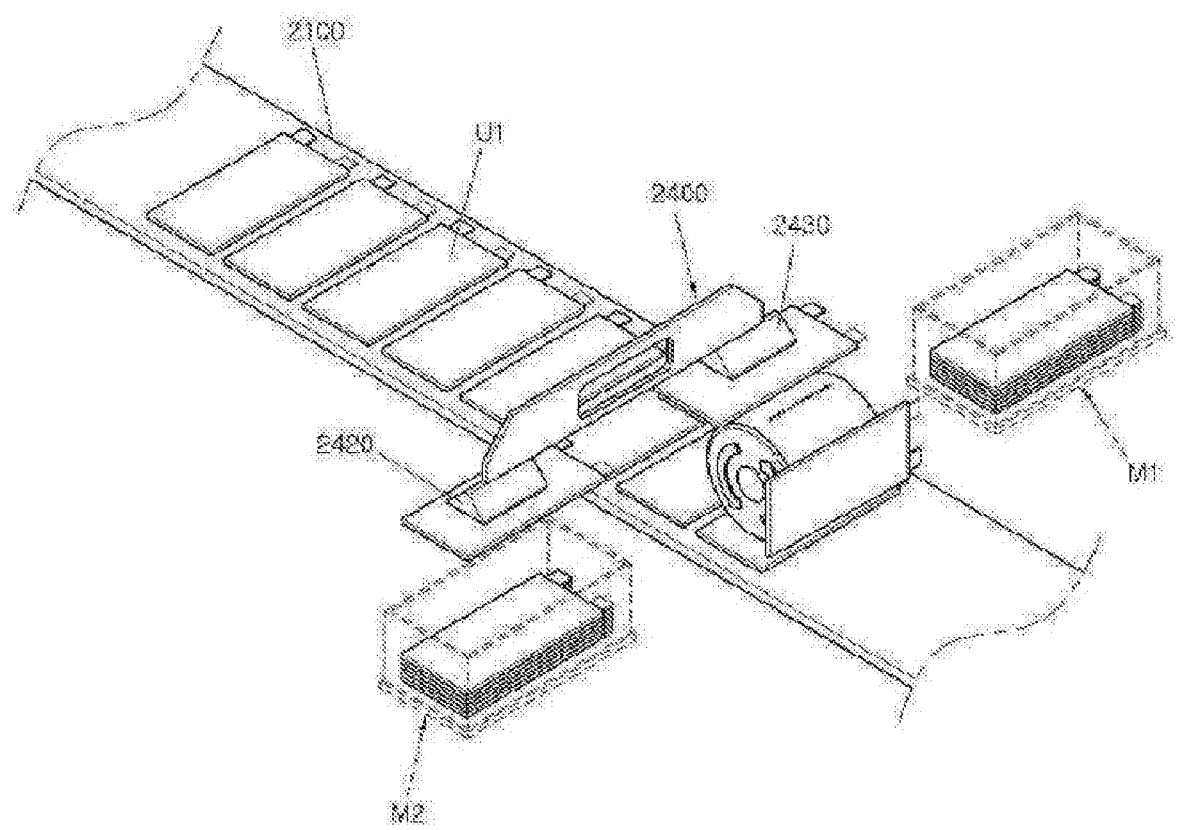
Figure 13:
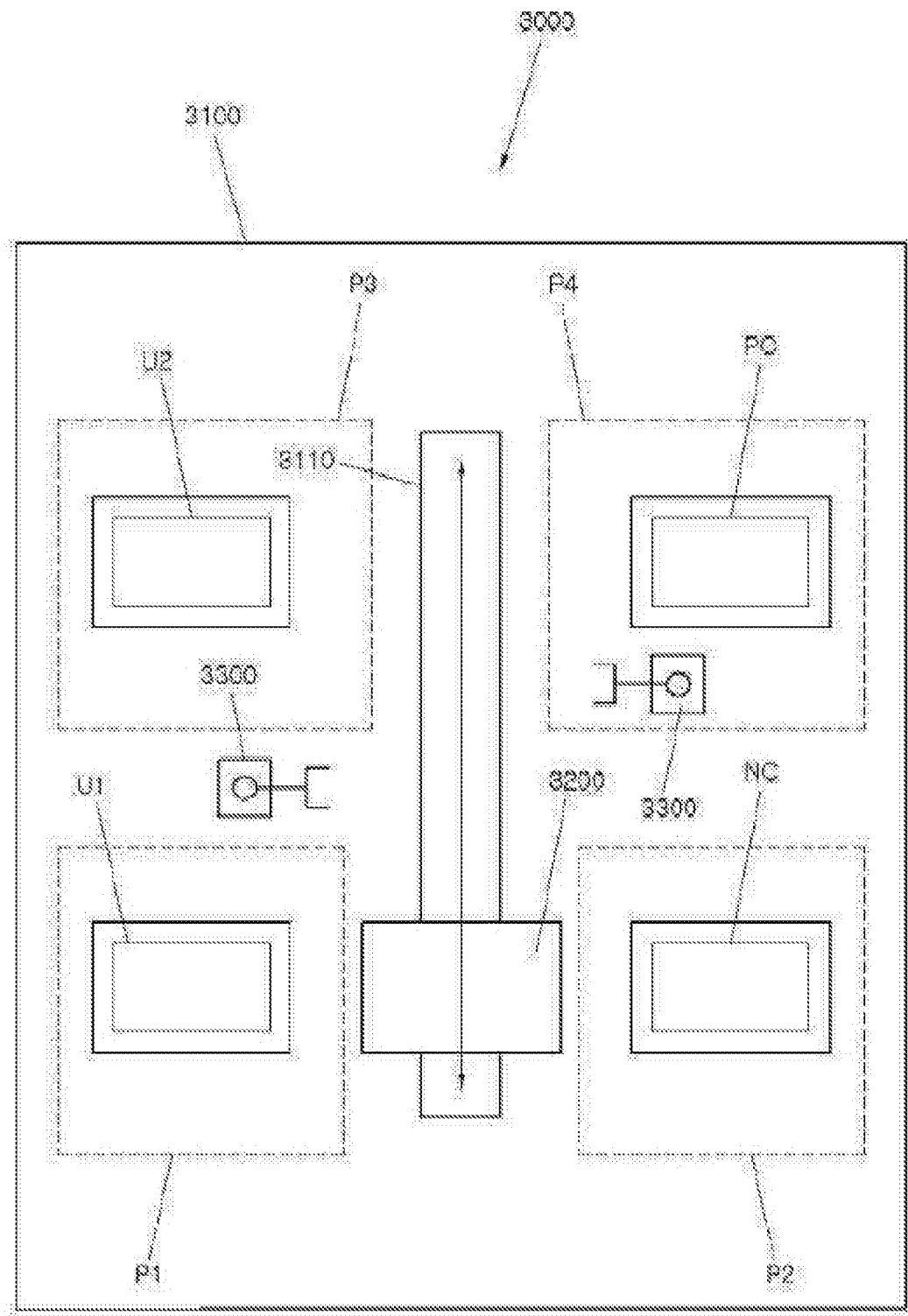
Figure 14:
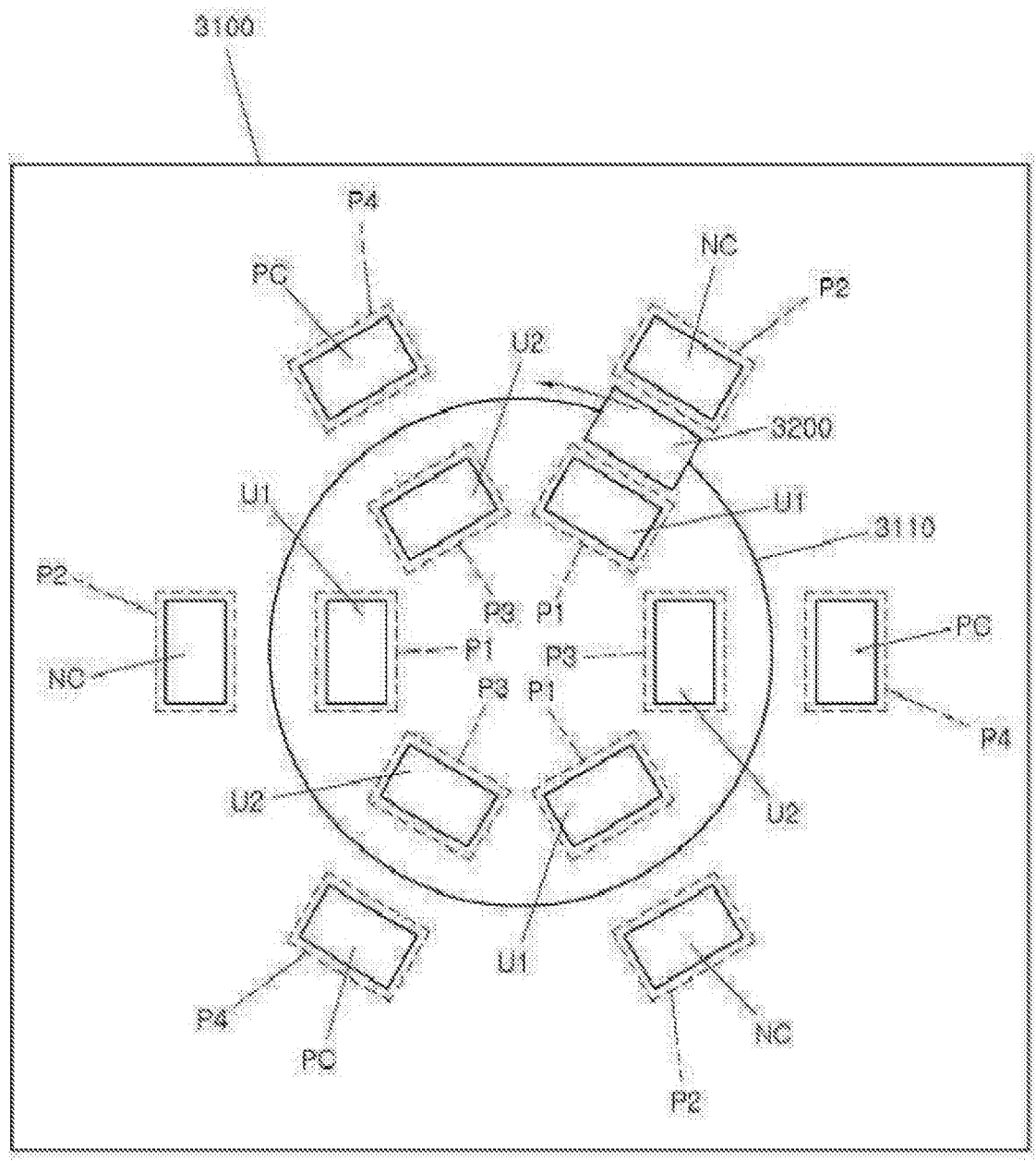
Figure 15:
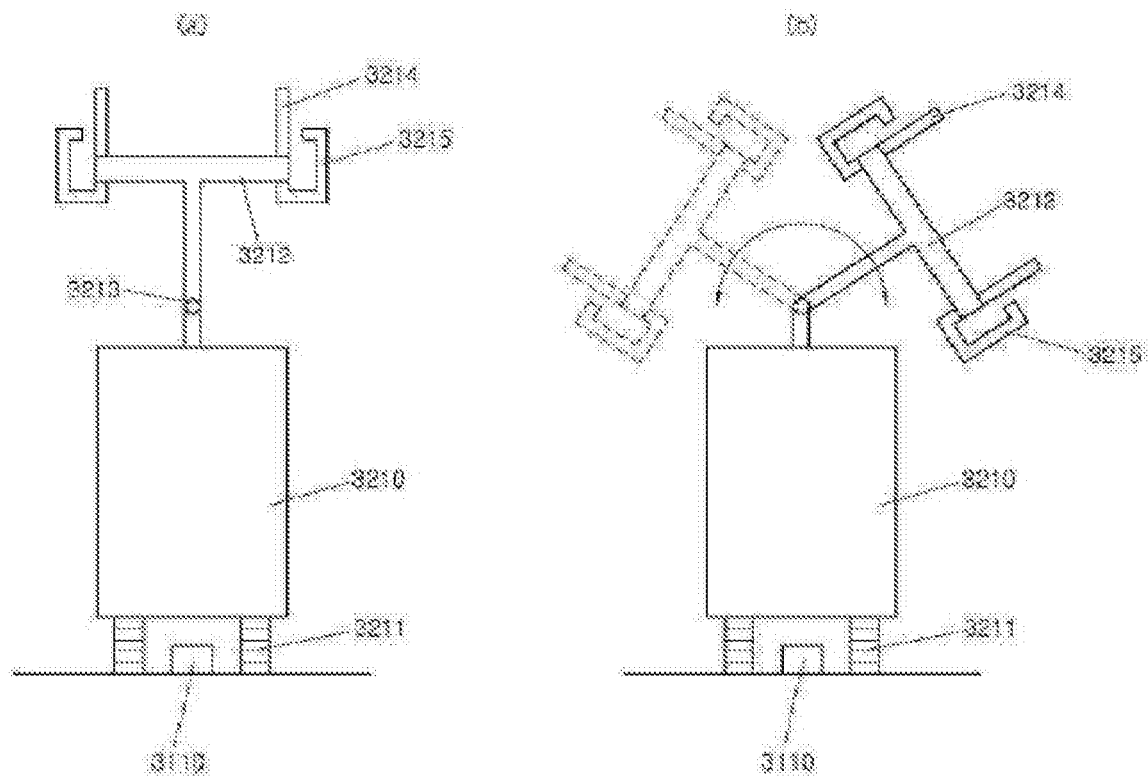

Drawing 4 illustrates the overturning device that is available in the secondary-cell manufacturing system which forms electrode assemblies with lamination in Drawing 1.

Drawing 5 is a flow chart that describes the operation of the overturning device in Drawing 4.

Drawing 6 or Drawing 12 shows the continuous overturning of unit-cells according to the flow chart in Drawing 5.

Drawing 13 or Drawing 14 illustrates the stacking device that is included in the secondary-cell manufacturing system which forms electrode assemblies with lamination as in Drawing 1.

Drawing 15 illustrates the stage that is included in the stacking device as in Drawing 13.

SPECIFICS FOR IMPLEMENTING THE INVENTION

The drawings attached below describe the secondary-cell manufacturing system which builds unit-cells with lamination as shown in the embodiment of the invention.

As shown in Drawing 1, the secondary-cell manufacturing system that forms electrode assemblies with lamination comprises the unit-cell-forming device (1000) that forms a unit-cell (U1) as stacked in the order of separator/negative cell/separator/positive cell/separator from a separator roll (R1), negative-cell roll (R2), and positive-cell roll (R3), the overturning device (2000) that forms an inverse unit-cell (U2) stacked in the order of separator/positive cell/separator/negative cell by overturning a portion of minimum 2 unit-cells (U1) that are formed by the unit-cell-forming device (1000), and the stacking device (3000) that performs stacking in the order of unit-cell/negative cell/inverse unit-cell/positive cell.

A unit-cell (U1) has a full-cell structure that is made up of separator/negative cell/separator/positive cell/separator. A negative cell is an electrode that has a negative polarity. Both sides of the negative current collector are coated with a cathode substance, and both sides of the positive current collector, which has a positive polarity, are coated with a anode substance. An inverse unit-cell (U2) has a full-cell structure made up of separator/positive cell/separator/negative cell/separator.

As shown in Drawing 2, the unit-cell-forming device (1000) may comprise the guide (1100) that handles the overlapping of separator, negative cell, and positive cell which are released from the separator roll (R1), the negative-cell roll (R2), and the positive-cell roll (R3), the negative-cell cutter (1200) which forms one or more negative cells by dividing the negative cells into a specified size and cuts the negative cells to ensure that they are arranged with a specified interval, the positive-cell cutter (1300) which forms the positive cells by dividing a positive cell into a specified size and cuts the positive cells to ensure that they are arranged with a specified interval, Laminator 1 (1401) and Laminator 2 (1402) that handles the orderly stacking and integration of separator, one or more unit-negative-cells that are arranged with a specified interval, separator, unit positive-cells that are arranged with a specified interval, and separator, and the unit-cell cutter (1500) which cuts in the unit cell (U1) size the separator which is integrated in Laminator 1 (1401) and Laminator 2 (1402), negative cells that are arranged with a specified interval, separator, positive cells that are arranged with a specified interval, and separator.

The guide (1100) compensates for the deflection of separator, negative cell, and positive cell by moving up and down and left to right, if the tensile strength is believed to have been compromised by deflection of separator, negative cell, and positive cell that are released from separator roll (R1), negative-cell roll (R2), and positive-cell roll (R3). Various sensors and control unit for controlling the operation of the guide (1100) may be provided to detect deflection.

Laminator 1 (1401) sequentially stacks and integrates separator, one or more negative cells that are arranged with a specified interval, and separator. Laminator 2 (1402) stacks and integrates sequentially negative cells that are arranged with a specified interval, separator, positive cells that are arranged with a specified interval, and separator.

As shown in Drawing 3 according to another embodiment of the invention, Laminator 1 (1401) sequentially stacks and integrates separator, one or more positive unit-cells that are arranged with a specified interval, and separator. Laminator 2 (1402) positions and integrates sequentially integrated separator, one or more positive unit-cells that are arranged with a specified interval, one or more negative cells that are arranged with a specified interval below the separator, and separator.

Again, as shown in Drawing 2, adhesive is applied over the surface of the separator. By generating heat and pressure, Laminator 1 (1401) and Laminator 2 (1402) integrates separator, one or more negative unit-cells that are arranged with a specified interval, separator, one or more positive unit-cells that are arranged with a specified interval, and separator.

And an idle roller (1600) which guides one or more negative unit-cells that are arranged with a specified interval, separator, one or more positive unit-cells that are arranged with a specified interval, and separator from Laminator 2 (1402) to the unit-cell cutter (1500) may be placed between Laminator 2 (1402) and the unit-cell cutter (1500). The unit-cell cutter (1500) vertically severs the chasm where negative cells and positive cells are absent. The unit-cell cutter (1500) may be provided as each blade protruding from top and bottom.

As shown in Drawing 4, the overturning device (2000) comprises the conveyor belt (2100) through which unit-cells (U1), forming a full cell, are continuously supplied, the suction drum (2200) which is placed on top surface of the conveyor belt (2100) and absorbs unit-cells (U1), the table (2300) which matches the one top side of the suction drum (2200) and takes over unit-cells (U1) as overturned from the suction drum (2200), and the top transporter (2400) which receives the unit-cells (U1) as overturned from the table (2300) and transports them to the magazines (M1, M2).

The suction drum (2200) is built into a cylinder. Rotating shaft is positioned at the center of the suction drum (2200). Rotating shaft receives the rotational force from the gearbox that lies on the side of the suction drum (2200). Suction drum (2200) includes one or more intake pipes. The circumferential surface of the suction drum (2200) forms a suction part (2210) where one or more suction holes (2211) are arranged latitudinal, parallel to the rotating shaft. In an embodiment of the invention, the circumferential surface of the suction drum (2200) develops 4 suction parts (2210). The four suction parts (2210) are arranged at the right angle over the circumferential surface of the suction drum (2200).

In another embodiment of the invention, besides the suction part (2210), suction drum (2200) may include a clamp or hand that momentarily clenches both longitudinal ends of a unit-cell (U1). And the suction drum (2200) may be built into a triangular prism instead of a cylinder. Notably, the rotating shaft may get off center instead of passing through the center of the suction drum (2200).

Meanwhile, intake pipes are connected either to suction hole (2211) or to suction part (2210). One or more intake pipes are connected to vacuum pump. One or more intake pipes are equipped with valves that regulate the suction force of a unit cell (U1) as affected by suction part (2201). The operation of the valves is controlled by control valves. Control valves control the operation of the valves, so that suction part (2210) suctions a unit-cell (U1) or deactivates the suctioning of the unit-cell (U1) by the logic, control map, formula etc. that are prepared in advance. And rubber is sprayed over the round surface of the suction drum (2200). When a unit-cell (U1) is rubbed against rubber, it is pushed from the suction drum (2200) to the table (2300).

The table (2300) is a plate that lies level with the ground. The table (2300) is equipped with a block (2310) which limits the position of a unit-cell (U1) on the top surface of the table (2300) by contacting the end of the unit-cell (U1). The block (2310) prevents a unit-cell (U1) from being dislocated from the table (2300) or falling onto the conveyor belt (2100). In another embodiment of the invention, the table (2300) may be equipped with a guide that ensures that a unit-cell (U1) comes into the right place.

Top transporter (2400) comprises the body (2410) which lies parallel to the rotating shaft of the suction drum (2200) and is placed at the top of the table (2300) to ensure its longitudinal shuttling and suction part 1 (2420) and suction part 2 (2430) that are available at both longitudinal ends of the body (2410).

The body (2410) is built into a beam. The body (2410) has an L-shaped hook at its top, where a roller is provided. The hook is installed to ensure that the roller may settle into the rail which is located at the top of the conveyor belt (2100). The roller is equipped with a motor. The motor rotates the roller, and the body (2410) plies longitudinally. Suction part 1 (2420) and suction part 2 (2430) are connected to the vacuum pump. The suction generated at the vacuum pump suctions the overturned unit-cell (U1).

According to an embodiment of the invention, when the body (2410) shuttles longitudinally, either suction part (2420) or suction 2 (2430) suctions the overturned unit-cell (U1) that lies at the table (2300) and either suction part (2420) or suction part (2430) in a contrary pair delivers the overturned suction part (2420) to the magazines (M1, M2). Namely, suction part (2420) and suction part 2 (2430) sequentially suction the overturned unit-cell (U1) and then sequentially deliver it to the magazines (M1, M2). The magazines (M1, M2) are placed symmetrically from the center of the conveyor belt (2100).

In another embodiment of the invention, the magazines (M1, M2) are split by the conveyor belt (2100), but its height from the ground may differ from its distance from the conveyor belt (2100).

Drawing 5 is a flow chart that describes the operation of the overturning device (2000). Drawing 6 or Drawing 12 depicts the continuous overturning of the unit-cell (U1) according to the flow chart as in Drawing 5.

As shown in Drawing 5 or Drawing 12, the operation of the overturning device (2000) comprises the stage in which one of one or more unit-cells (U1) which are transported to the conveyor belt (2100) arrives to the location of suction, the stage in which the unit-cell (U1) which has arrived to the location of suction is suctioned by the suction drum (2200), the stage in which the unit-cell (U1) that lies close to the top transporter (2400) is overturned when it moves from the bottom of the suction drum (2200), which is close to the conveyor belt (2100), to the top of the suction drum (2200), which is close to the top transporter (2400) and as the suction drum (2200) rotates, the stage in which the unit-cell (U1) is delivered as overturned from the suction drum (2200) to the table (2300), and the stage in which the top transporter (2400) takes over the overturned unit-cell (U1) from the table (2300) and transports it to the magazines (M1, M2).

As shown in Drawing 6, one of one or more unit-cells (U1) that are delivered by the conveyor belt (2100) is suctioned to the suction drum (2200) through the stage in which they arrive to the location of suction and the stage in which they are suctioned.

As shown in Drawing 7, the unit-cell (U1), which is suctioned to the suction drum (2200) by the rotation of the suction drum (2200), is moved from the bottom of the suction drum (2200) to the top of the suction drum (2200), at the stage in which the unit-cell (U1) is overturned as it moves. Here, some other unit-cell (U1) that has reached the location of suction is suctioned to the suction drum (2200).

As shown in Drawing 8 or Drawing 9, the top transporter (2400) moves longitudinally so that suction part 1 (2420) which is available on the one longitudinal side may suction the overturned unit-cell (U1) before suction part 1 (2420) may reach the magazines (M1, M2). When suction part 1 (2420) moves longitudinally so that it may arrive to the magazines (M1, M2), some other unit-cell (U1) gets overturned as it moves from the bottom of the suction drum (2200) to the top of the suction drum (2200) and then is delivered from suction drum (2200) to the table (2300).

As shown in Drawing 10, when suction part 1 (2420) arrives to the magazines (M1, M2), suction part 2 (2430) suctions some other overturned unit-cell (U1). After suction part 2 (2430) suctions some other unit-cell (U1) and suction part 1 (2420) delivers the unit-cell (U1) to the magazines (M1, M2), top transporter (2400) moves longitudinally so that suction part 2 (2430) may move to some other magazines (M1, M2) that is placed across the conveyor belt (2100) asymmetrical to the magazines (M1, M2). Here, some other overturned unit-cell (U1) that has been suctioned to suction drum (2200) according to the rotation of the suction drum (2200) gets overturned as it moves from the bottom of the suction drum (2200) to the top of the suction drum (2200) and then is delivered from suction drum (2200) to the table (2300).

As shown in Drawing 12, when suction part 2 (2430) arrives to the magazines (M1, M2), suction part 1 (2420) suctions some other overturned unit-cell (U1) that lies at the table (2300).

As described above, suction drum (2200) overturns the unit-cell (U1) by repeatedly suctioning it as it rotates and delivers the overturned unit-cell (U1) to the table (2300). Top transporter (2400), which shuttles longitudinally, moves the overturned unit cell (U1) which lies at the table (2300) to either of the two magazines (M1, M2) and then, delivers it to either of the magazines (M1, M2).

Accordingly, the overturning device (2000) as in the embodiment of the invention can easily overturn a unit-cell (U1), because the unit-cell (U1) which is suctioned to suction drum (2200) gets overturned as it moves from the bottom of the suction drum (2200) to the top of the suction drum (2200).

Notably, as it ensures the continuous stacking of the overturned unit-cells (U1) in the magazines (M1, M2), the invention makes it handy to prepare overturned unit-cells (U1) to make secondary cells.

As shown in Drawing 13, the stacking device (3000) comprises the floor (3100) which prepares the unit-cell (U1) in Position 1 (P1), negative cell (NC) in Position 2 (P2) vis-à-vis the unit-cell (U1), inverse unit-cell (U2) in Position 3 (P3), and positive cell (PC) in Position 4 (P4) vis-à-vis inverse unit-cell (U2), the stage that plies between the unit-cell (U1) and negative cell (NC) and between inverse unit-cell (U2) and positive cell (PC), and one or more robot arms (3300) that sequentially stack in the stage (3200) the cells/negative cells/inverse cells/positive cells which are ready in Position 1 (P1) or Position 4 (P4).

Position 1 (P1) and Position 3 (P3) lie on the one side of the path (3110) through the stage (3200) travels, and Position 2 (P2) and Position 4 (P4) stand on the other side of the path (3110) where the floor (3100) has been formed.

The path (3110) is formed as linear, curved, oval, or circular in the floor (3100). Position 1 (P1), Position 2 (P2), Position 3 (P3), and Position 4 (P4) are arranged as vertical to the path (3110). As shown in Drawing 13, if the path (3110) is linear, the stage (3200) moves forward or backward, shuttling between Position 1 (P1), Position 2 (P2), Position 3 (P3), and Position 4 (P4). As shown in Drawing 14, if the path (3110) is oval or circular, Position 1 (P1), Position 2 (P2), Position 3 (P3), and Position 4 (P4) form repeatedly and the stage (3200) moves into a specified direction along the circumference.

Drawing 15 is a diagram that illustrates the stage (3200). As shown in Drawing 15, the stage (3200) is built so it may tilt toward Position 1 (P1), Position 2 (P2), Position 3 (P3), and Position 4 (P4) at a specified crossing angle. The stage (3200) comprises the trunk (3210), which moves along the path (3110), and the tilting seat (3212), which lies on the top surface of the trunk (3210) and tilts left or right across the hinge (3213) which lies level with the ground.

The trunk (3210) is equipped with the wheel which operates along the path (3110) and the driver which rotates the wheel (3211). The tilting seat (3212) is equipped with the guide (3214) that ensures that the unit-cell (U1), inverse unit-cell (U2), negative cell (NC), and positive cell (PC) may settle in the right positions. The tilting seat (3212) is equipped with the clamping unit (3215) that fastens the unit-cell (U1), inverse unit-cell (U2), negative cell (NC), and positive cell (PC).

Again as shown in Drawing 13, it is by the robot arm (3300) that the unit-cell (U1), negative cell (NC), inverse unit-cell (U2), and positive cell (PC) are stacked above the stage (3200). The robot arm (3300) may be placed each on the side of Position 1 (P1), Position 2 (P2), Position 3 (P3), and Position 4 (P4). In some other embodiment, the robot arm (3300) may be placed between Position 1 (P1), Position 2 (P2), Position 3 (P3), and Position 4 (P4). In this case, the robot arm (3300) moves among Position 1 (P1), Position 2 (P2), Position 3 (P3), and Position 4 (P4) and can move any one from among the unit-cell (U1), negative cell (NC), inverse unit-cell (U2), and positive cell (PC) to the stage (3200). If the path (3110) is circular, the stage (3200) may be equipped with a robot arm (3300).

The secondary-cell manufacturing system constructed as in this invention, which builds unit-cells with lamination, simplifies the electrode-assembly building process and decreases the defect rate with the built electrode assemblies.

Notably, the building of unit-cells (U1) is easy as they are built with lamination. And as it has adopted the method that stacks alternately the unit-cells (U1) and the electrode cells that are built with lamination, the invention can significantly decrease the frequency of rework by eliminating defective electrodes in advance during the preparation stage. Moreover, it can settle the unit-cells (U1) and electrode cells in their right positions with the tilting stage (3200) and robot arms (3300). Ultimately, it can reduce the defect rate with the electrode assemblies.

What is claimed is:

1. A secondary-cell manufacturing system, which forms an electrode assembly with lamination, the system comprising:
   a unit-cell-forming device comprising at least one separator roll, a negative-cell roll, and a positive-cell roll, and configured to form a plurality of unit-cells, each unit-cell stacked in an order of separator, negative cell, separator, positive cell, and separator;
   an overturning device configured to overturn at least two of the unit-cells formed by the unit-cell forming device to form inverse unit-cells, each inverse unit-cell stacked in an order of separator, positive cell, separator, negative cell, and separator; and
   a stacking device that performs stacking to form the electrode assembly, each electrode assembly stacked in an order of unit-cell, negative cell, inverse unit-cell, and positive cell,
   wherein the stacking device comprises:
   a floor which deploys the unit-cell in a first position, a negative cell in a second position to mirror the first position of the unit-cell, the inverse unit-cell in a third position, and a positive cell in a fourth position to mirror the third position of the inverse unit-cell;
   a stage configured to move between the first position of the unit-cell and the second position of the negative cell and between the third position of the inverse unit-cell and the fourth position of the positive cell; and
   one or more robot arms configured to stack the unit-cell, negative cell, inverse unit-cell, and positive cell positioned in the first, second, third, and fourth positions, respectively, onto the stage.

2. A secondary-cell manufacturing system, which forms an electrode assembly with lamination, the system comprising:
   a unit-cell-forming device comprising at least one separator roll, a negative-cell roll, and a positive-cell roll, and configured to form a plurality of unit-cells, each unit-cell stacked in an order of separator, negative cell, separator, positive cell, and separator;
   an overturning device configured to overturn at least two of the unit-cells formed by the unit-cell forming device to form inverse unit-cells, each inverse unit-cell stacked in an order of separator, positive cell, separator, negative cell, and separator; and
   a stacking device that performs stacking to form the electrode assembly, each electrode assembly stacked in an order of unit-cell, negative cell, inverse unit-cell, and positive cell,
   wherein the overturning device comprises:
   a conveyor belt through which the unit-cells are continuously supplied;
   a suction drum which is located on a top surface of the conveyor belt which suctions and overturns the unit-cells;
   a table which is located on one side at a top portion of the suction drum and configured to receive the overturned unit-cells from the suction drum; and
   a top transporter which transports the received overturned unit-cells from the table to a magazine.

* * * * *